United States Patent Office 3,434,082
Patented Mar. 18, 1969

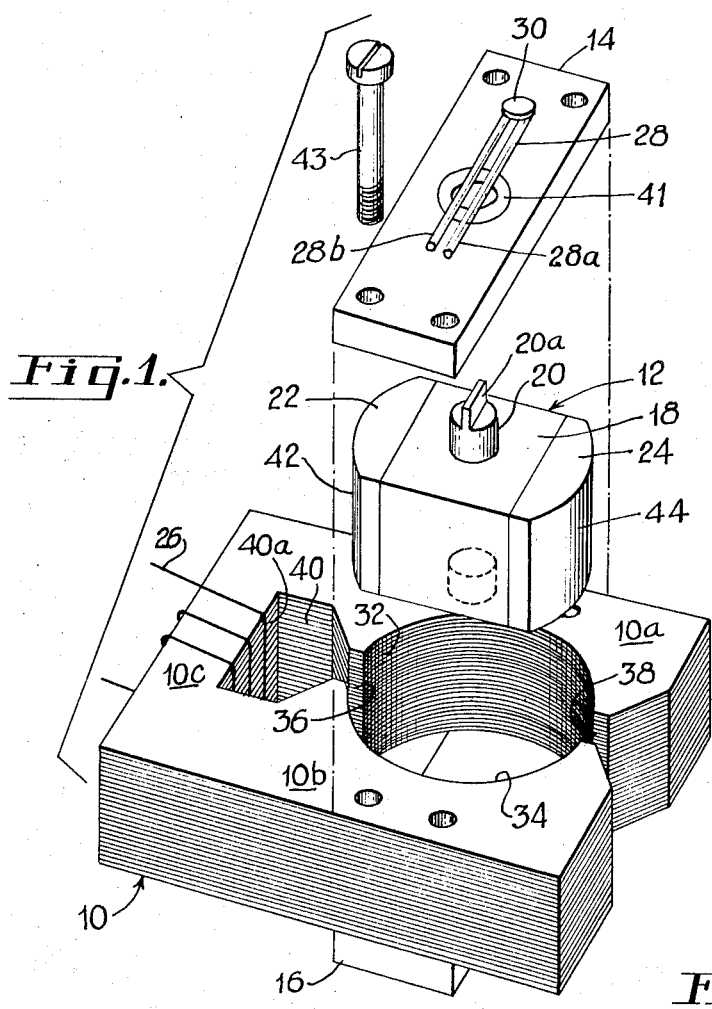

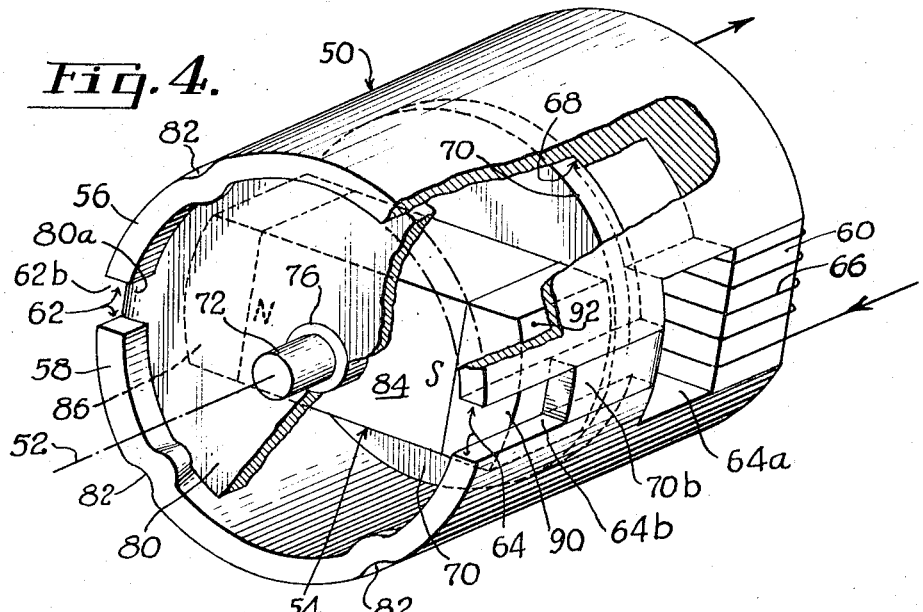
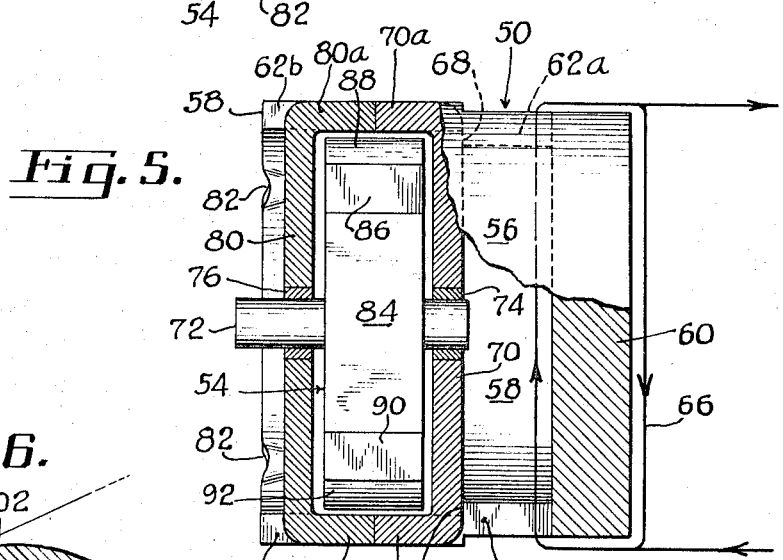
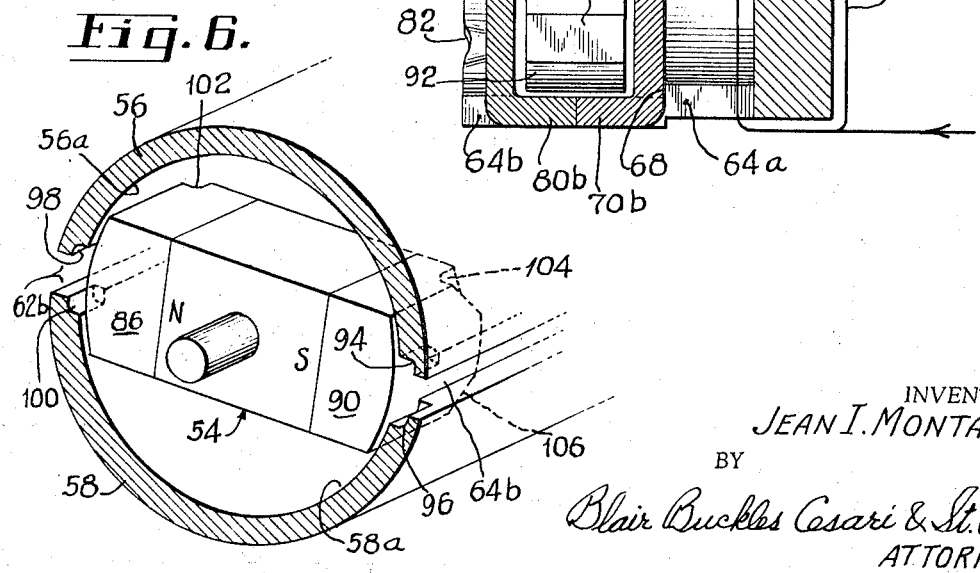
INVENTOR.
JEAN I. MONTAGU

3,434,082
LIMITED ROTATION TRANSDUCER HAVING PERMANENTLY MAGNETIZED ROTOR
Jean I. Montagu, Boston, Mass., assignor to Mechanics for Electronics, Cambridge, Mass.
Filed Apr. 17, 1967, Ser. No. 631,341
U.S. Cl. 335—229                14 Claims
Int. Cl. H01f 7/08; H02k 21/12

ABSTRACT OF THE DISCLOSURE

A rotary actuator having a rotor carrying a permanent magnet with a magnetically soft pole piece on each magnet pole. The stator has an electromagnet arranged between two magnetically soft pole shoes that are disposed about the rotor to provide parallel magnetic flux paths between the pole pieces for the permanent magnet field. The rotor pole pieces form parallel magnetic flux paths between the stator pole shoes for the field of the electromagnet.

Background

This invention relates to an electromechanical actuator producing limited rotary movement.

In particular, it provides a rotary actuator having a first magnet on a stator element and a permanent magnet on a rotor element. The stator and rotor elements are so arranged that the interaction of the fields of the two magnets turns the rotor element according to the magnitude of the field of the first magnet, which is generally an electromagnet.

The actuator has an usually low cost construction. Further, it develops relatively high torque and is fast, particularly in comparison with solenoid-type actuators. The actuator is useful in driving numerous mechanisms including windshield wipers and mechanical switches. It can advantageously be used in place of a solenoid actuator, for it has advantages of solenoids without some of the disadvantages.

The actuator is also useful in an event recorder to drive a marking pen or other recording instrument. Such a recorder registers the occurrence, but not the magnitude, of events on an advancing chart or strip. The relatively high speed of the present actuator enhances the sensitivity and time-accuracy of these instruments. The ability of the actuator to move in opposite directions according to the polarity of the electrical input signal enables the recorder to report the polarity of an event together with its occurrence.

United States Patent No. 3,177,385 and the pending application Ser. No. 493,101, owned by the assignee hereof, describe rotary actuators having an electromagnet and a permanent magnet arranged in the stator element and having a rotor element of magnetically permeable material. The interaction of the fields of the two magnets turns the rotor through an angle related to the current in the electromagnet. These actuators can fairly readily be made highly accurate. However, they have not been used extensively as actuators where lesser accuracy is acceptable but cost is an important factor.

Instead, the solenoid has been a principal low cost actuator. However, it is not particularly fast and it requires a relatively large input current to produce the desired output force.

Accordingly, it is an object of the present invention to provide an improved low cost actuator. A more particular object is to provide an electromechanical actuator at less cost than a solenoid of at least comparable load capability, i.e. output force or torque.

A further object of the invention is to provide an improved low-cost, electromechanical actuator that is reversible.

Another object is to provide an actuator of the above character producing rotary movement.

It is a further object of the invention to provide an actuator having one or more of the above characteristics and which has relatively high efficiency in that it produces a comparatively large torque relative to the electrical input power. It is also desired that the actuator have comparatively fast operation.

Other objects of the invention will in part be obvious and will in part appear hereinafter.

The invention accordingly comprises the features of construction, combinations of elements, and arrangement of parts exemplified in the constructions hereinafter set forth, and the scope of the invention is indicated in the claims.

Summary of the invention

An actuator embodying the invention has a stator with an electromagnet impressing a controllable magnetic potential between facing arcuate pole surafces. A rotor rotatable inside the stator pole surfaces has two opposed pole pieces, each closely radially-spaced opposite both stator pole surfaces. The rotor pole pieces thus form separate, parallel paths for the field of the stator electromagnet between the stator pole surfaces; each path including two air gaps between the rotor and the stator.

The rotor also has a permanent magnet impressing a static magnetic potential between the rotor pole pieces. The field of the permanent magnet reinforces the electromagnet field in one of the two gaps between each rotor pole piece and the two stator pole surfaces opposite it. The permanent magnet field opposes the electromagnet field in the other of the two gaps adjacent each pole piece.

As a result of these different fields in the rotor-stator gaps, the rotor turns from a neutral position by an angle that depends on the current in the stator electromagnet. The rotor rapidly changes position as the electromagnet current changes, and the direction of rotation changes with the polarity of the electromagnet current.

Further, the actuator turns the rotor with a large torque relative to the magnitude of the electromagnet current. In particular, the actuator requires on the order of ten times less electrical input power than a solenoid to develop the same load-moving capability. In addition, the actuator can be constructed for a cost generally the same or less than that of a solenoid of comparable load capability.

Brief description of the drawings

For a fuller understanding of the nature and objects of the invention, reference should be had to the following detailed description taken in connection with the accompanying drawings, in which:

FIGURE 1 is a partially exploded view of an actuator embodying the invention;

FIGURES 2 and 3 are top plan views of the actuator of FIGURE 1, with the upper bearing plate removed, showing the paths for the control magnetic field and the static magnetic field;

FIGURE 4 is a perspective view, partly broken away, of another actuator embodying the invention;

FIGURE 5 is a top plan view, partly broken away, of the actuator of FIGURE 4; and FIGURE 6 is a fragmentary perspective view of the FIGURE 3 actuator showing modifications that can also be employed with the FIGURE 1 actuator.

Description of preferred embodiments

FIGURE 1 shows the new actuator constructed with a planar stator 10 to which a rotor 12 is mounted by means of two bearing plates 14 and 16. The rotor 12 has a permanent magnet 18 centrally mounted with respect to a shaft 20. Pole pieces 22 and 24 are secured to the magnet poles. Direct current in a coil 26 wound on the stator 10 causes the rotor to turn from the neutral position shown in FIGURE 2 to a position such as is indicated in FIGURE 3. The direction of rotation and the magnitude of torque depend on the polarity and magnitude, respectively, of the current in the coil 26.

As also shown in FIGURE 1, a restoring spring 28 resiliently urges the rotor 12 to the neutral position of FIGURE 2. There are many ways to provide this restoring operation. The illustrated spring 28 is a U-shaped cotter-pin-like spring having a pair of opposed cantilever spring arms 28a and 28b. A rivet 30 secures the spring to the bearing plate 14 at the base of its U-shape.

A flattened extension 20a on the rotor shaft 20 extends beyond the bearing plate 14 when the actuator is assembled and the flat surfaces thereof are compressively engaged between the spring arms 28a and 28b. The spring arms have minimum deflection when the rotor is in its neutral position (FIGURE 2) and are increasingly deflected by substantially the same amount when the rotor turns from this position. The spring arms thus exert on the rotor a restoring force whose magnitude is essentially the same for either direction of rotation.

As also shown in FIGURE 1, the illustrated stator 10 is assembled of magnetically permeable laminations as is conventional in electromagnetic structures. It is a generally rectangular block apertured and slotted to define two parallel pole shoes 10a and 10b joined by a link member 10c.

Specifically, the stator 10 has a rotor-receiving aperture formed by opposed hemicylindrical pole surfaces 32 and 34 conforming to a common cylinder centered on the rotation axis of the rotor 12. Diametrically opposed air gaps 36 and 38 circumferentially separate the pole surfaces 32 and 34. The gap 38 communicates with the outer periphery of the stator block at one end thereof and the other gap 36 communicates with an aperture 40 adjacent the other end of the stator block. The bottom side 40a of the aperture 40 forms one side of the link member 10c, which is the core on which the coil 26 is wound. The remaining sides of the aperture 40 provide a relatively high-reluctance air space between the pole shoes 10a and 10b intermediate the link member 10c and the gap 36.

The bearing plates 14 and 16, each having a bushing 41 mounted therein, are fastened to opposite sides of the stator, appropriately by means of bolts that hold the stator laminations together. The bushings are concentric with the rotor shaft 20 and support it for rotation relative to the stator.

As indicated above, the rotor 12 has a permanent magnet 18 arranged to maintain a static magnet potential between two pole pieces 22 and 24 that are symmetrically disposed on diametrically opposed sides of the rotor. The pole pieces, of magnetically permeable material, are suitably secured to the magnet poles by an epoxy adhesive. They have circularly-arcuate outer surfaces 42 and 44 closely spaced within the stator pole surfaces 32 and 34, respectively. In particular, the radial spacing between each rotor surface 42, 44 and the opposite stator surface, 32, 34 is considerably less than one-half the width of either gap 36 or 38.

When the rotor 12 is in the neutral position shown in FIGURE 2, the rotor surface 42 is circumferentially centered on the gap 36 and extends opposite both stator surfaces 32 and 34 by equal circumferential lengths to define equal-length air gaps 46a and 46b, shown only in FIGURES 2 and 3. Similarly, in this position the rotor surface 44 extends equally opposite the stator surfaces 32 and 34 to define equal-length air gaps 48a and 48b.

The magnetic potential which the permanent magnet 18 maintains between the pole pieces 22 and 24 develops a static magnetic field that passes between the magnet poles by way of the two pole pieces 22, 24, the stator 10 and the intervening air gaps. Three paths for this static magnetic field, one through each of the pole shoes and one through the link member, are shown with dotted lines in FIGURES 2 and 3.

Further, the static magnetic fields in the four gaps 46a, 46b, 48a and 48b are equal. In the gaps 46a and 46b, the fields have the same direction, illustrated as directed from the rotor to the stator, and the fields in the gaps 48a and 48b also are of the same direction, i.e. directed toward the rotor. Further, the static fields in the four gaps remain substantially constant, and hence equal, as the rotor turns so long as each rotor surface 42 and 44 remains radially opposite both stator surfaces 32 and 34. Accordingly, when there is no current in the coil 26, the magnetic energy in each of the four gaps is equal and there is theoretically no torque urging the rotor from its neutral position.

When the coil 26 carries a direct current, it develops a current-dependent magnetic potential between the opposed surfaces of the pole shoes 10a and 10b. The pole pieces 22 and 24 form two parallel, magnetically-identical paths, indicated in FIGURE 3 with dashed lines, between the stator surfaces 32 and 34 for the resultant control field. One path from the stator surface 32 to the other surface 34 successively threads the gap 46a, the pole piece 22 and the gap 46b. The other path threads the gap 48a, the pole piece 24 and the other gap 48b. No significant flux passes between the stator pole shoes 10a and 10b by way of the gaps 36 or 38, for these gaps are materially larger than the series and parallel sum of gaps 46a, 46b, 48a, 48b.

The control magnetic flux in the gaps 46a, 46b, 48a, 48b has substantially equal magnitude and the resultant control fields in the gaps change with rotor rotation. However, whereas the static magnetic fields in the gaps 46a and 46b have the same direction, the control fields in these gaps are oppositely directed. In particular, in FIGURE 3, the two fields in gap 46b have the same direction, and they have opposite directions in gap 46a. Similarly, the static and control fields have the same direction in gap 46b, but have opposite directions in gap 48a. Accordingly, the combined field in gap 46b is larger than in gap 46a and the combined field in gap 48a is larger than in gap 48b. These unequal fields develop a counterclockwise torque on the rotor 12, causing it to turn from its neutral position to the position shown in FIGURE 3. The magnitude of the torque, and hence the angle of rotation, corresponds to the magnitude of the current in the coil 26 when pushing against spring 28.

A reversal of the coil current reverses the direction of the control field and hence reverses the direction of rotation.

An alternative construction of the actuator, shown in FIGURES 4 and 5, employs a generally cylindrical stator 50 coaxial with the rotation axis 52 of a rotor 54.

The stator 50 comprises two generally hemicylindrical shells 56 and 58 coaxially extending from a circular end plate 60; all of magnetically permeable material. The shells 56 and 58 may be considered as forming the legs of a U-shape and the end plate 60 as forming its base; just as the FIGURE 1 pole shoes 10a and 10b are arranged roughly in a U-shape with the link member 10c.

The shells 56 and 58 are separated by diametrically opposed gaps 62 and 64, each having a wide section 62a, 64a adjacent the end plate 60 and a narrow section 62b, 64b radially opposite the rotor. A coil 66 is wound around the end plate 60 through the wide gaps 62a and 64a.

The inner surfaces 56a and 58a of the stator shells are cylindrical, at least opposite the rotor. However, along the axial length of the narrow gap sections 62b, 64b, the inner diameter of the shells is larger than the corresponding diameter along the wide gap sections 62a, 64a. This forms an annular shoulder 68 against which a rotor support plate 70 is seated.

The illustrated support plate 70 is an annular disk having two diametrically opposed tabs 70a and 70b extending therefrom parallel to the rotation axis 52. Each tab 70a and 70b is seated in and spans one gap section 62b, 64b, respectively, for half the axial length of the gap section. The diameter of the plate 70, aside from at the tabs, is dimensioned to fit snugly between the stator shells 56 and 58.

This engagement of the support plate 70 between the stator shells and seated against the shoulder 68, with the tabs interfitting in the gaps 62 and 64, securely locates the support plate concentric with the cylindrical inner surface of the stator shells and, further, prevents it from rotating with respect to the stator. The plate 70 also holds the shells apart.

With further reference to FIGURES 4 and 5, one end of the rotor shaft 72 is seated in a bushing 74 carried on the support plate 70. The other end of the rotor shaft is supported for rotation about the axis 52 in a bushing 76 carried on a second rotor support plate 80 identical to the support plate 70. The plate 80 is disposed between the stator shells with its tabs 80a and 80b butted against the ends of the tabs 70a and 70b, respectively, on the support plate 70. The assemblage of the support plates and rotor within the stator shells is conveniently secured by crimping or upsetting the rim of the stator shells, which extend axially beyond the support plate 80, against the outer rim of the support plate 80 at several circumferentially spaced points.

The support plates are of a material having a relatively low magnetic permeability and hence present only high reluctance paths between the stator shells. In particular, the reluctance between the stator shells at the narrow gap sections 62b and 64b is considerably larger than the reluctance of the magnetic flux path between the shells through the rotor pole pieces 84 and 86 across the air gaps, now to be discussed, separating the rotor from the stator shells.

As also shown in FIGURES 4 and 5, the rotor 54 is essentially identical to the rotor 12 in FIGURE 1. It has a permanent magnet 84 centered on the rotation axis 52 and to which the shaft 72 is mounted. A pole piece 86 is secured to one pole of the magnet 84 and has a circularly-arcuate surface 88 normally circumferentially centered on the gap section 62b and closely radially spaced from the stator shell surfaces 56a and 58a. Diametrically opposite the pole piece 86 is a like pole piece 90 secured to the other magnet pole and having an arcuate surface 92 closely radially spaced, normally for equal circumferential lengths, from the surfaces 56a and 58a.

The coil 66 and the permanent magnet 84 of the actuator of FIGURES 4 and 5 develop essentially the same configurations of magnetic fields as the coil 26 and permanent magnet 18 in the actuator of FIGURE 1. Accordingly, the operation of the two actuators is essentially identical.

The similarity between the actuators of FIGURE 1 and 4 can be further appreciated by noting that the wide gap sections 62a and 64a in FIGURE 4 correspond to the FIGURE 1 aperture 40 and the narrow gap sections 62b and 64b of FIGURE 4 correspond to the FIGURE 1 gaps 36 and 38.

Also, the actuator of FIGURES 4 and 5 is generally used with a restoring spring such as is illustrated in FIGURE 1. For the FIGURE 4 actuator, the spring can be mounted on the rotor support plate 80 and engage the shaft 72 where it passes through this support plate. Further, the rotary motion which the actuators of FIGURES 1 and 4 develop can conveniently be coupled to a load by connection to the rotor shaft.

Turning to FIGURE 6, when the actuator of FIGURES 4 and 5 has recesses 94 and 96 in the edges of the stator shells 56 and 58 defining the narrow gap section 64b, and has like recesses 98 and 100 in the edges of the shells adjacent the narrow gap section 62b, as described in U.S. Patent No. 3,177,385, the rotation as a function of coil current is different from that realized when there are no recesses. Generally, the linearity of rotation as a function of coil current can be increased by means of the recesses. However, depending on the configuration and size of the recesses 94–100, the rotation can be made a selected nonlinear function of coil current, although the nonlinearity is generally less than is obtained when there are no recesses.

When the motor turns counterclockwise to the point where the edge of rotor surface 90 just comes opposite the recess 96, the area of the surface 90 opposite the stator surface 58a drops rather abruptly. The area of the surface 90 opposite the other stator surface 56a, does not experience a corresponding change. Accordingly, at this rotation angle, the counterclockwise torque on the rotor will increase over the value it would have had in the absence of the recess 96. The recess 98 has a like effect at the other side of the rotor. And when the rotor turns clockwise, the recesses 94 and 100 cause the clockwise torque to increase by the same mechanism.

Alternative to providing the recesses 94 through 100 in the stator shells as shown, the rotor pole pieces 86 and 90 can have four recesses, three of which are shown at 102, 104 and 106. These recesses are illustrated as being tapered in axial dimension to provide a continual increase in torque as the rotor turns beyond the point where one recess starts to be opposite the stator gaps 62b, 64b. Moreover, both the stator shells and the rotor pole pieces can be provided with recesses that are either opposite each other or axially removed from each other, depending on the desired rotation as a function of current. Recesses such as those illustrated can also be provided simply to increase the torque with which the rotor turns as the rotation angle increases from the neutral position. And further, the arrangement of the recesses does not necessarily have to be symmetrical. Nor do the recesses have to be at the axial ends of the pole pieces or gap sections 62b and 64b; although this arrangement generally involves the least machining cost.

The actuator of FIGURE 1 can also be provided with recesses in the manner described above with reference to FIGURE 6. That is, the FIGURE 1 stator surfaces 32 and 34 can be recessed to enlarge the circumferential width of the gap 36 and/or of the gap 38. Likewise, recesses can be provided in one or more circumferential edges of the rotor surfaces 42, 44.

The foregoing rotary electromagnetic actuators have a permanent magnet in the rotor element and a controllable magnet, generally an electromagnet, in the stator element. They can readily be fabricated at low cost and yet operate with high speed and with relatively high efficiency. Further, they are compact and rugged.

It will thus be seen that the objects set forth above, among those made apparent from the preceding description, are efficiently attained.

The following claims are intended to cover all of the generic and specific features of the invention herein described, and all statements of the scope of the invention which, as a matter of language, might be said to fall therebetween.

Having described the invention, what is claimed as new and secured by Letters Patent is:

1. An electromagnetic rotary actuator comprising
   (A) a stator element (10, 50)
      (1) having first and second magnetically permeable pole shoes (10a, 10b, 56, 58) forming respectively, first and second arcuate pole surfaces (32, 34) circumferentially spaced apart,
      (2) having magnet means (26, 66) for developing a controllable magnetic potential between said pole surfaces, and
   (B) a rotor element (12, 54)
      (1) mounted for rotation within said pole surfaces about a first axis and having a first rotation position,
      (2) having first and second magnetically permeable pole pieces (22, 24, 86, 90) forming respectively, third and fourth surfaces (42, 44, 88, 92), each of which is disposed radially opposite a portion of each stator pole surface when said rotor is in said first position, so that
         (a) each pole piece forms, with the gaps between it and said stator element, a magnetic flux path between said first and second pole surfaces, and
         (b) each pole shoe forms, with the gaps between its arcuate surface and said pole piece, a magnetic flux path between said rotor pole pieces, and
      (3) having a permanent magnet (18) arranged to produce a magnetic potential between said pole pieces.

2. An actuator according to claim 1 in which said stator and rotor elements are so further arranged that the reluctance of each magnetic flux path between said stator pole surfaces by way of said pole pieces, and between said pole pieces by way of said rotor pole shoes, remains substantially constant when said rotor element rotates through at least a selected angle from said first position.

3. An actuator according to claim 1 in which the circumferential length of each of said third and fourth surfaces opposite said first stator pole surface changes inversely with the circumferential length thereof opposite said second stator pole surface when said rotor element rotates through at least a selected angle from said first position.

4. An actuator according to claim 1 in which at least one said surface on one of said elements has a surface portion whose dimension parallel to said rotation axis changes with circumferential position about said one surface, said dimension changing in such a manner that when said rotor turns through a given rotation, the areas of said rotor surface opposite each stator element surface, where one of said surfaces has said changing dimension, change at different rates as a function of rotation.

5. An actuator according to claim 1 in which said first, second, third and fourth surfaces are circularly-arcuate about a common center disposed on said axis of rotor rotation.

6. An actuator according to claim 1 in which
   (A) said stator element includes a magneticlly permeable link member (10c, 60) connected between said pole shoes, and
   (B) said magnet means includes a winding on said link member.

7. An actuator acording to claim 6 in which
   (A) said link member and said pole shoes lie in a common plane, and
   (B) said rotor element is mounted for rotation about an axis transverse to said plane of said stator element.

8. An actuator according to claim 6
   (A) in which said link member is spaced from said first and second surfaces along said rotation axis.

9. An actuator according to claim 1 further comprising means (28) resiliently urging said rotor to said first rotation position.

10. An actuator according to claim 1 in which said magnet means comprises a winding (26, 66) on said stator element and forming an electromagnet therewith.

11. An actuator according to claim 1 in which at least one said surface on one of said elements has an axially-extending portion of lesser arcuate extent than the rest of said one surface, said reduced portion being so arranged that when said rotor element is turned by a given angle, at said reduced surface portion, the area of said rotor element surface opposite said stator element surface changes with further rotation relative to the area of said rotor element surface opposite said stator element surfaces elsewhere than at said reduced portion.

12. An electromagnetic rotary actuator comprising
   (A) first and second magnetically permeable stator pole shoes (10a, 15b, 56, 58) having opposed, concentric circularly-arcuate surfaces symmetrically circumferentialy spaced apart by first and second high reluctance gaps,
   (B) a magnetically permeable link member (10c, 60) forming a low reluctance path between said pole shoes,
   (C) magnetic means (26, 66) arranged to develop a controllable magnetic potential between said pole shoes, and
   (D) a rotor element (12, 54)
      (1) mounted for rotation about the common axis of said pole shoe surfaces and having a neutral rotation position,
      (2) having a permanent magnet (18, 84) mounted thereon with the magnetic poles thereof substantially diametrically opposed, and
      (3) having first and second magnetic pole pieces (22, 24, 86, 90) each of which is secured to one pole of said permanent magnet and has an arcuate outer surface disposed, when said rotor is in said neutral position, radially opposite one of said first and second gaps and portions of both pole shoe surfaces adjacent said gap.

13. An actuator according to claim 12 further comprising
   (A) a rotor supporting disk member (70)
      (1) disposed between said pole shoes spanning the space between them substantially transverse to said rotor axis,
      (2) rotatably supporting said rotor element, and
      (3) having at least one extension thereon disposed in one of said first and second gaps in engagement with the pole shoe surfaces forming said one gap.

14. An actuator according to claim 12 further comprising
   (A) means forming a shoulder protruding radially inward from said stator surfaces intermediate said rotor element and said link member,
   (B) a first rotor-supporting disk member
      (1) disposed between said pole shoes seated against said shoulder means,
      (2) having diametrically opposed edge surface portions in engagement with said stator surfaces,
      (3) rotatably supporting said rotor, and
      (4) having a pair of diametrically opposed extensions thereon disposed in said first and second gaps respectively in engagement with the pole shoe surfaces forming said gaps, (C) a second rotor-supporting disk member
  (1) disposed between said pole shoes on the sides of said rotor opposite from said first disk member and rotatably supporting said rotor,
  (2) having a pair of extensions thereon disposed in said first and second gaps in engagement with the pole shoe surfaces forming said gaps,
  (3) arranged with said extensions thereon in axially abutting engagement with said extensions on said first disk member and
(D) securing means fixed to said pole shoes and holding said second disk member from movement along the axis of rotor rotation in the direction away from said shoulder.

References Cited

UNITED STATES PATENTS

| | | | |
|---|---|---|---|
| 2,317,187 | 4/1943 | Griffiths | 310—156 |
| 2,794,137 | 5/1957 | Faus et al. | 310—156 XR |

GEORGE HARRIS, *Primary Examiner.*

U.S. Cl. X.R.

310—156